(12) United States Patent
Griswold

(10) Patent No.: US 11,282,545 B2
(45) Date of Patent: Mar. 22, 2022

(54) EDITING OF CAMERA TRANSITION POINTS IN MULTICAMERA VIDEOS USING OVERLAPPING VIDEO SEGMENTS FOR SCRUBBING

(71) Applicant: Robert Mark Griswold, Cupertino, CA (US)

(72) Inventor: Robert Mark Griswold, Cupertino, CA (US)

( * ) Notice: Subject to any disclaimer, the term of this patent is extended or adjusted under 35 U.S.C. 154(b) by 0 days.

(21) Appl. No.: 16/898,775

(22) Filed: Jun. 11, 2020

(65) Prior Publication Data

US 2020/0395048 A1 Dec. 17, 2020

Related U.S. Application Data

(60) Provisional application No. 62/860,745, filed on Jun. 12, 2019.

(51) Int. Cl.
*G11B 27/034* (2006.01)
*G11B 27/34* (2006.01)
*H04N 5/247* (2006.01)
*H04N 5/262* (2006.01)

(52) U.S. Cl.
CPC ........... *G11B 27/034* (2013.01); *G11B 27/34* (2013.01); *H04N 5/247* (2013.01); *H04N 5/2621* (2013.01)

(58) Field of Classification Search
CPC ...... G11B 27/034; G11B 27/34; H04N 5/247; H04N 5/2621; H04N 21/47205; H04N 21/41407; H04N 21/8547
See application file for complete search history.

(56) References Cited

U.S. PATENT DOCUMENTS 9,652,459 B2   5/2017  Dombrowski et al.
2019/0012383 A1*  1/2019  Bostick ................ G06F 16/787

* cited by examiner

*Primary Examiner* — Girumsew Wendmagegn
(74) *Attorney, Agent, or Firm* — Greenberg Traurig, LLP

(57) ABSTRACT

A computer-implemented method for electronically editing a multi-camera video of a sporting event includes receiving, by a server, a request for editing a multi-camera video including a plurality of video streams from a browser of a user device. The server sends the multi-camera video as requested to the browser of the user device for display in a video player. The server causes the video player to display a widget including a timeline, a plurality of transition points, and a plurality of video segments. The server receives, from the user device, a modified transition point including a timestamp associated with the transition point. The server generates a multi-camera video based on the modified transition points.

17 Claims, 10 Drawing Sheets

EDITING OF CAMERA TRANSITION POINTS IN MULTICAMERA VIDEOS USING OVERLAPPING VIDEO SEGMENTS FOR SCRUBBING

RELATED APPLICATIONS

The present application claims priority to U.S. Provisional Application No. 62/860,745, filed on Jun. 12, 2019, the entirety of which is hereby incorporated by reference.

FIELD OF THE TECHNOLOGY

At least some of the embodiments disclosed herein relate to video and image capturing systems and technology. More specifically, embodiments disclosed herein relate to systems and methods for editing of camera transition points in multi-camera video using overlapping video segments for scrubbing.

BACKGROUND

Capturing video of events such as sporting events with a camera can be difficult and limiting. Typically, a sporting event, e.g., a swim meet, ski race, or track event, can have a set path or course for participants. To capture video of such events, a spectator or family member of a participant may have a camera capturing video from a position located in designated areas such as the stands and may be restricted from being near the race course during the event to capture different views of the participant. As such, capturing different and varying views at different locations of the participant during the event is difficult, especially if only a single camera is used and limited to a designated area. Furthermore, finding transition points in the captured video and editing the video can be difficult.

SUMMARY

Techniques for editing of camera transition points in multi-camera video using overlapping video segments for scrubbing are disclosed. For one example, a computing system provides a video player. The video player plays a multi-camera video and provides transitions points for a user to select to render the multi-camera video with the selected transition points. For example, the user can be presented with a video player in a browser (e.g. a web browser) or a video player in a standalone application (e.g., a mobile application) to play back multi-camera videos. The video player can display transition points indicated as handles in a timeline of a recorded multi-camera video. The user can select or click on the handles and drag or scrub through the video with video preview in which clips of the video are shown. The user can release the handles when the user reaches a desired transition point. When finished adjusting transition points, the user can select or press an option or button in the video player which can trigger or signal a backend rendering service, e.g., a cloud-based service, to generate rendered or finished high resolution video with desired camera transition points. Such disclosed techniques enable an end user to edit a multi-camera video easily, eliminating the need to use sophisticated video production software.

Other apparatuses, methods, systems and computer-readable mediums are disclosed for implementing techniques for editing of camera transition points in multi-camera video using overlapping video segments for scrubbing.

A computer-implemented method for electronically editing a multi-camera video of a sporting event is disclosed. The method includes receiving, by a server, a request for editing a multi-camera video including a plurality of video streams from video player of a user device. The server sends the multi-camera video as requested to the video player of the user device for display in the video player. The server causes the video player to display a widget including a timeline, a plurality of transition points, and a plurality of video segments. The server receives, from the user device, a set of modified transition points including a timestamp associated with each of the transition points. The server generates a multi-camera video based on the modified transition points.

A system includes a server having a processor and a memory; a communication network; and a database in electronic communication with the server. The server is configured to provide a widget that a user can load onto a computing device having a display screen and an input device, the widget permitting the user to electronically edit a multi-camera video. The server receives a request for editing a multi-camera video including a plurality of video streams from the widget. The server sends the multi-camera video as requested to the user device for display in a video player. The server causes the video player to display a timeline, a plurality of transition points, and a plurality of video segments in the widget. The server receives, from the user device, a modified set of transition points including a timestamp associated with each of the transition points. The server generates a multi-camera video based on the modified transition points.

BRIEF DESCRIPTION OF THE DRAWINGS

References are made to the accompanying drawings, which form a part of this disclosure, and which illustrate examples of the systems and methods described herein.

Like reference numbers represent like parts throughout.

DETAILED DESCRIPTION

Figure 1A:
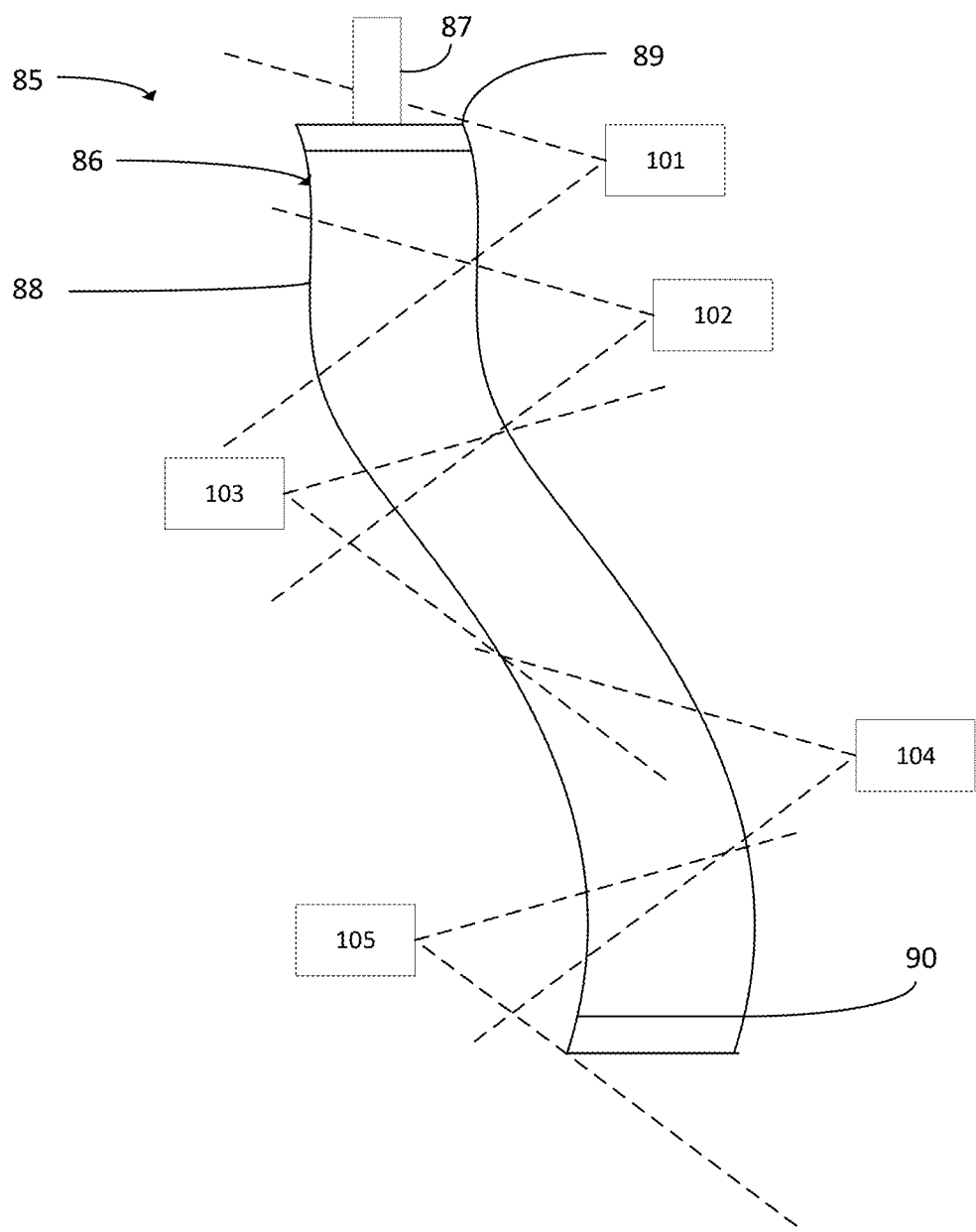
FIG. 1A illustrates an example of a system of cameras at an example sporting event, according to an embodiment.

Capturing video of events such as sporting events with a camera can be challenging. Typically, a sporting event can have a set path or course for participants. To capture video of such events, a spectator (e.g., a family member or the like) of a participant may have a camera capturing video from a set or standing position located in designated areas such as the stands. The spectator may otherwise be restricted from being near the race course during the event to capture different views of the participant. As such, capturing different and varying views at different locations of the participant during the event is difficult, especially if only a single camera is used.

Sporting events generally have timing systems indicating start and finish times (and sometimes different intermediate times often referred to as split times) of a participant racing on or around the course. The timing systems are generally not tied or synchronized to camera systems. Thus, when editing video captured by a spectator, it is difficult to know the time during the event that corresponds to a moment or frame in the captured video of the participant.

Embodiments described herein are directed to systems and methods that enable improved editing of videos of sporting events. The captured video is time synchronized with the electronic starting system, the electronic timing system, or a combination thereof, to provide a better connection to the timing of the sporting event in which the video is captured. This is because the integration with the electronic starting system, the electronic timing system, or combination thereof, can be used to know when a race starts relative to a video frame corresponding to that start time. Similarly, the time synchronization enables capturing of the frame in each of the video feeds corresponding to a time for switching camera angles (e.g., switching to a different camera in the system) so that the resulting multi-camera video smoothly transitions between camera angles with no perceptible skipped or repeated frames.

Techniques for editing of camera transition points in multi-camera video using overlapping video segments for scrubbing are disclosed. Such techniques generally are not previously possible, as most video of sporting events is captured in a manner that is not tied to the timing of the sporting event. The disclosed techniques enable an end user to edit a multi-camera video easily in a browser or application, eliminating the need to use sophisticated video production software.

In an embodiment, a user is presented with a video player in a web browser or standalone application of a computing system to playback multi-camera videos. The video player can display transition points indicated as handles in a timeline of a recorded multi-camera video. Each of these handles represents a timecode associated with a camera transition point. The user can select or click on the handles and drag or scrub through the video with video preview in which clips of the video are shown. The user can release the handles when the user reaches a desired transition point. When finished, the user can select or press an option or button in the video player which sends the newly selected camera transition point timecodes to a backend rendering service, e.g., a cloud-based service, and trigger such service to generate rendered or finished high resolution video with desired camera transition points with no perceptible skipped or repeated frames.

An event, as used herein, generally includes a sporting event.

A sporting event, as used herein, generally includes a set path or course performed for a limited duration and to achieve the fastest (i.e., shortest) time for completing the set path or course. The set path or course can be completed one or multiple times, depending on the sporting event. Suitable examples of sporting events include, but are not limited to, a swim meet, a ski event (e.g., skiing or snowboarding), a track event, bicycle racing, car racing, motorcycle racing, or the like. A sporting event includes an electronic timing system. The electronic timing system can also include an electronic starting system for signaling the start of the sporting event.

Cameras can be placed in set locations to capture different views of the participants throughout the course. The cameras can be situated such that different views or lanes (of the course) can be captured by the cameras without the cameras being individually manned or controlled. The cameras can be time synchronized with the electronic timing system, the electronic starting system, or a combination thereof, of the sporting event and the multi-camera videos can be time synchronized with the results of individual participants. Such a video capturing system can tie exact frames in video footage from each camera to start times for the sporting event.

A browser, or web browser, as used herein, includes a software application for accessing information on a network such as the Internet.

A widget, as used herein, includes an application, or a component of a user interface, that enables a user to perform a function or to access a service.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described to provide a concise discussion of the embodiments and examples.

FIG. 1A illustrates an example of a system 85 of cameras 101-105 at an example sporting event 86, according to an embodiment. The sporting event 86 in the illustrated embodiment is intended to be exemplary and can be representative of any event in which a participant 87 follows a set course 88 (e.g., once) from start 89 to finish 90. It is to be appreciated that the course 88 can be repeated (i.e., participant must return from the finish 90 to the start 89, in which case the start 89 may also represent the end of the race).

The illustrated embodiment shows cameras 101-105 oriented toward the course 88. As can be seen in the figure, the cameras 101-105 are oriented so that the participant 87 can be captured on video from the start 89 to the finish 90. There are areas of overlap between the views of the different cameras 101-105, but the cameras 101-105 are generally oriented to capture unique views of the participant 87. The cameras 101-105 are placed such that a pattern of transitions between the cameras 101-105 is known. For example, there would be no reason to begin capturing video at camera 105 and then transitioning to camera 101 during a race going from start 89 to finish 90. Rather, a progression including camera 101—camera 102—camera 103—camera 104—camera 105 would provide a view of the participant 87 throughout the entire race from start 89 to finish 90.

In an embodiment, the cameras 101-105 may be movable to change an orientation of the view. In such an embodiment, the pattern (e.g., 101-102-103-104-105) would still be followed. In an embodiment in which the cameras 101-105 are moveable, the cameras 101-105 can include a sensor such as, but not limited to, a motion sensor so that the cameras 101-105 can automatically follow a participant along the course for a portion of the course 88.

Figure 1B:
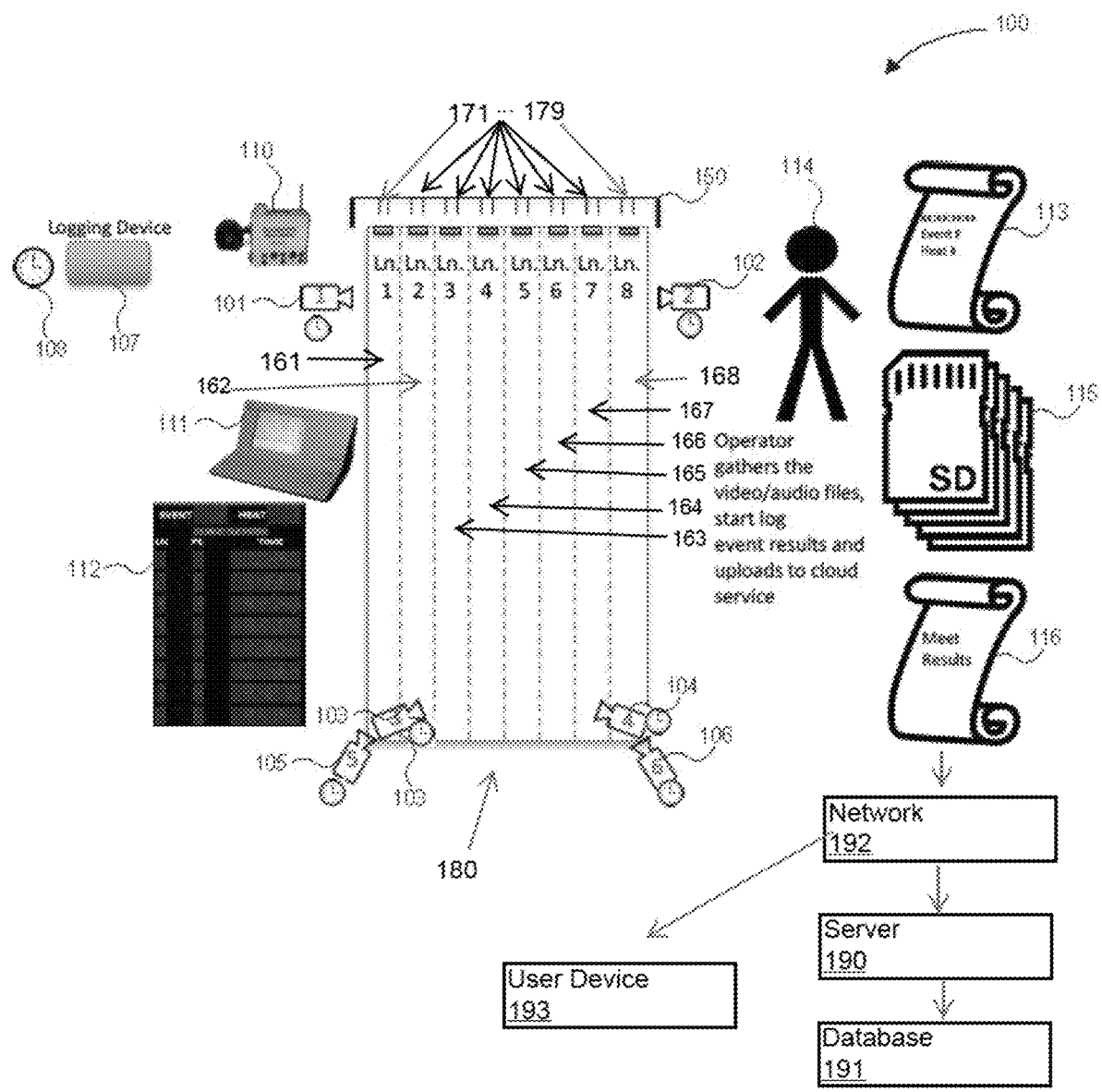
FIG. 1B illustrates one example of a system of cameras to generate a multi-camera video at another example sporting event, according to an embodiment.

FIG. 1B illustrates one example of a system 100 of cameras 101 to 106 to generate multi-camera event videos, according to an embodiment.

The system 100 can be used to capture multi-camera videos of a sporting event. In the illustrated embodiment, the sporting event is a swimming event at swimming pool 150. It will be appreciated that this is an example of a sporting event and that the actual venue and type of sporting event can vary according to the principles described herein.

In the illustrated embodiment, swimming pool 150 includes eight lanes 161-168. Any number of lanes (e.g., fewer than eight or more than eight) can be used for a swim meet for swimming pool 150. The number of lanes 161-168 having competitors can be less than the number of lanes in the pool. That is, in an embodiment, the swimming pool 150 can include eight lanes, but competitors may be present in some of the lanes, but not all the lanes.

In the system 100, any number and type of cameras 101-106 can be used. For example, the system 100 can include one or more cameras 101-106 above the water, one or more cameras 101-106 below the water, as well as combinations thereof. The system 100 includes at least two cameras 101-106. In an embodiment, the cameras 101-106 may have a changeable view provided the cameras 101-106 still capture a unique view relative to each other. The cameras 101-106 may also have some overlap in their views so that the participant can be captured throughout the course without interruption. Accordingly, overlapping views which still provide different views are considered to be unique for purposes of this description.

In the illustrated embodiment, six cameras 101-106 are used. It is to be appreciated that any number of cameras greater than one can be implemented for system 100.

The cameras 101-106 can include any camera capable of recording video. Suitable examples of the cameras 101-106 include, but are not limited to, compact or point-and-shoot cameras, zoom compact cameras, advanced compact cameras, adventure cameras, digital single lens reflex (DSLR) cameras, compact mirrorless cameras and medium format camera types, remote cameras connected to a common video recording device (similar to a multi-camera video surveillance system), or camera modules connected to a computing or data processing system as shown, e.g., in FIG. 8, or connected to a microprocessor board such as, e.g., a Raspberry Pi® board. Each camera 101-106 or video recording device contains an accurate clock that can be synchronized to the time of a logging device 107.

Each of cameras 101-106 can have one or more memories to store video data and internal clocks. In an embodiment, the cameras 101-106 can include limited memory onboard the camera 101-106 for storing video data and can instead be electronically connected to a memory separate from the cameras 101-106 for storing the video data.

Although the illustrated system 100 is shown for a swimming event, system 100 can implement multiple cameras 101-106 for other types of sporting events such as, but not limited to, a track event or a racing event in which participants race on or around a set path having start and finish times to place the participants.

Cameras 101-106 can be installed in fixed locations around the swimming pool 150 to capture different views/angles of participants swimming in swimming pool 150. For example, cameras 101 and 102 can capture videos of views on the left and right side of the starting blocks 171-179 of participants swimming in lanes 161-168 of swimming pool 150. Camera 101 can capture video of swimmers in lanes 161-164 and camera 102 can capture video of swimmers in lanes 165-168 at the starting blocks 171-179 of swimming pool 150. Cameras 103 and 104 can capture videos of swimmers under water from the bottom left and right side of turn end 180 of swimming pool 150 of participants swimming in lanes 161-168. Cameras 105 and 106 can capture videos above swimming pool 150 down at the swimmers from the bottom left side and right side of the turn end 180 pointing to lanes 161-168 of participants swimming. These camera placements are examples, and actual camera placement along with what is being recorded can vary according to the principles described herein.

In the illustrated embodiment, because the path of the swimming event is known (i.e., starting at starting blocks 171-179 and finishing at starting blocks 171-179 or at turn end 180), a pattern for transitioning between the cameras can be determined. For example, for a swimmer in lane 161, the pattern would be camera 101, camera 105, camera 103, camera 105, camera 101 in a race in which the start and finish are both at starting block 171. If additional laps of the pool 100 are to be completed, the pattern repeats. This pattern is established based on the course or path of the sporting event. This pattern is established because, for example, it is known that a view starting with camera 105 would not be desirable, as the participant may not even be in view of the camera 105 at the beginning of the race.

In the illustrated embodiment, the logging device 107 is electronically connected to an electronic starting system 110 and an electronic timing system 111 of a sporting event (e.g., swim meet at swimming pool 150) in which the start times of each race can be logged 113 and therefore tied to exact frames in video footage captured from cameras 101-106.

In an embodiment, upon receiving a start signal from the electronic starting system 110 for the sporting event, logging device 107 can log time/timecode data at the instant of the start of every race/event in the log 113. In an embodiment, the log 113 can be stored in a database within logging device 107. In an embodiment, the log 113 can be stored in a cloud storage electronically connected to logging device 107. In an embodiment, the log 113 can be stored in a database having a portion within logging device 107 and a portion stored in a cloud storage. In an embodiment, the logging device 107 can be configured to automatically upload the information on a periodic basis (e.g., every hour, few hours, or the like) without operator interaction.

In the illustrated embodiment, the logging device 107 is electronically connected to the electronic starting system 110 and electronically connected to an electronic timing system 111 and a scoreboard 112 of a sporting event in which exact start times of each race can be logged along with race data 112 identifying each race such as, e.g., event number, heat number, or the like.

In an embodiment, race data 112 can include specific metadata (e.g., event number, heat number, race name, etc.). Race data 112 can be collected and obtained by logging device 107 electronically connected to scoreboard 112 and electronic timing system 111. For example, logging device 107 can directly request or query the electronic timing system 111 or scoreboard 112 in real time and can be stored in log 113 along with time/timecode data.

For one example, upon receiving a start signal from the electronic starting system 110 for the sporting event, logging device 107 can log time/timecode data at the instant of the start of every race/event in a log 113. For one example, log 113 can be stored in a database within logging device 107 or can be stored in a cloud storage connected to logging device 107. Logging device 107 can also log race data 112 including specific metadata (e.g., event number, heat number, race name, etc.).

In the illustrated embodiment, the logging device 107 can be electronically connected to the electronic timing system 111 and scoreboard 112 of a sporting event in which race start times can be logged and race data 112 collected and a user or operator 114 collecting comprehensive event results 116, race data 113, and video files 115. In an embodiment, the operator 114 can collect video files 115 including audio data, race data 113 including start logs, and results file 116, and save the data on logging device 107 or upload the collected data to a cloud-based service or cloud storage or to be accessed by a browser or a standalone application and played by a video player as described herein. The cloud-based service includes a server 190 and a database 191 for storing the video files 115 and race data 113 received via a network 192 (e.g., the Internet or the like). The server 190 and information stored in database 191 can be made available to a user device 193 via the network 192. The server 190 can generally be representative of a computing device (e.g., see FIG. 8 for additional details). The user device 193 can generally be representative of a computing device (e.g., see FIG. 8 for additional details). The user device 193 can generally include a web browser having a media player embedded therein. The user device 193 can include a media player within an application stored on the user device 193. The user device 193 and media player can be used by the user to view and edit multi-camera videos in accordance with the principles described in FIGS. 2-7 and 9 below.

Figure 2:
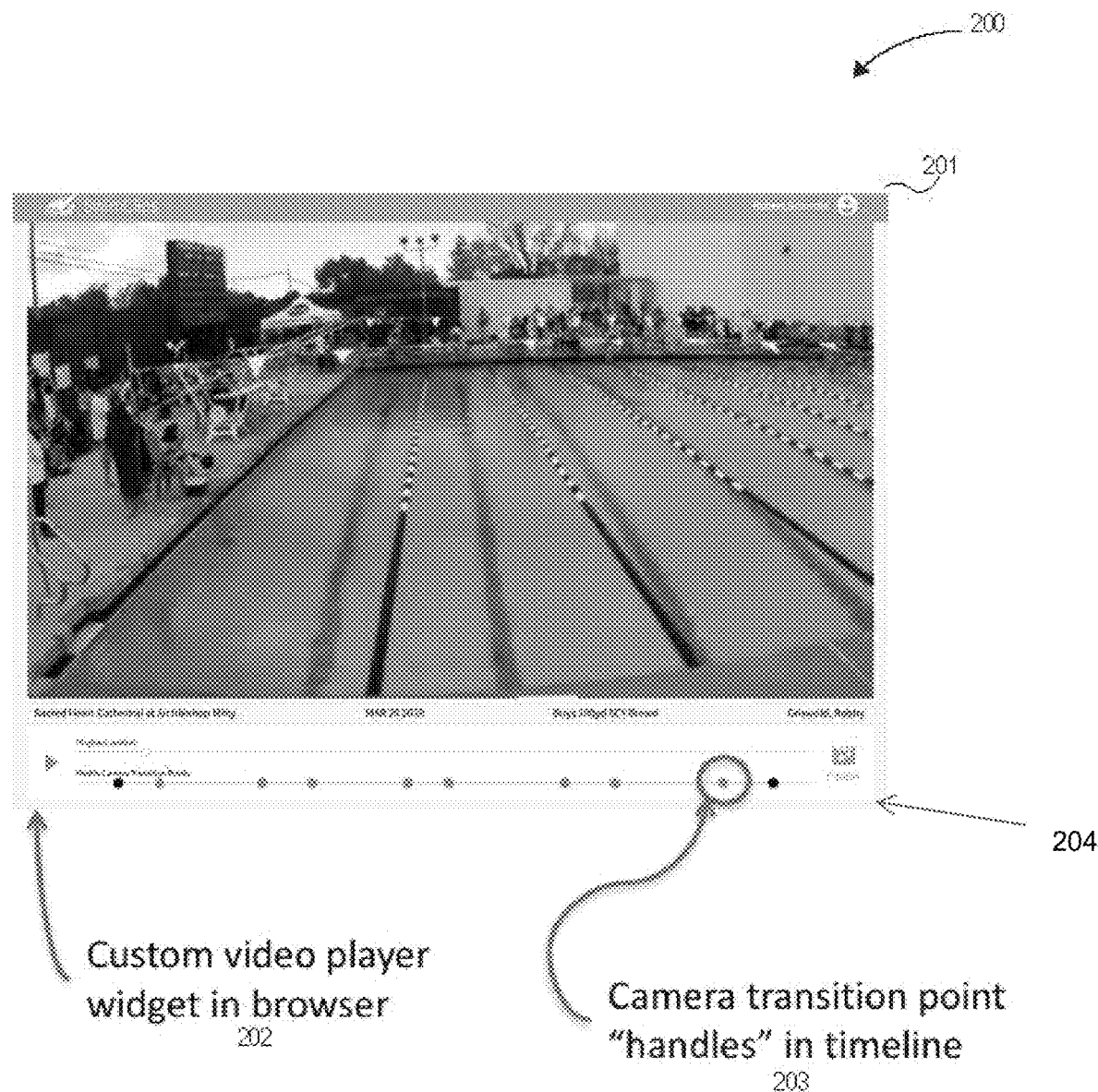
FIG. 2 illustrates one example of a multi-camera video screenshot of a video player including a video widget and camera transition point handles on a timeline, according to an embodiment.

FIG. 2 illustrates one example of a multi-camera video graphical user interface (GUI) 200, according to an embodiment. The illustrated multi-camera video GUI 200 is representative of an in-browser (i.e., a web browser) video player 201 having an in-browser video widget 202 and camera transition point handles 203 on a timeline 204. It is to be appreciated that the GUI 200 can be a standalone application (i.e., not integrated into an in-browser video player), according to other embodiments.

In an embodiment, the video player 201 can be a standard video player embedded in a browser customized with widget 202 and transition point handles 203 to play back multi-camera video using the system 100 as described in FIG. 1B. For example, in an embodiment, the video player can be an HTML5 video player embedded in a web browser. In an embodiment, in-browser video player 201 can be configured to provide additional functionality to implement the techniques disclosed herein. The video files 115 and race data 113 can be sent from the server 190 to the web browser of the user device 193 for display via the network 192 (e.g., the Internet or the like).

In an embodiment, the video files may be stored in database 191 (FIG. 1B) in separate files (e.g., one file per camera 101-106, it is possible to have separate files per camera 101-106 corresponding to a part of the sporting event). When the video files are loaded to the video player 201, the user interacts as if the separate video files are integrated in a single file.

Figure 3:
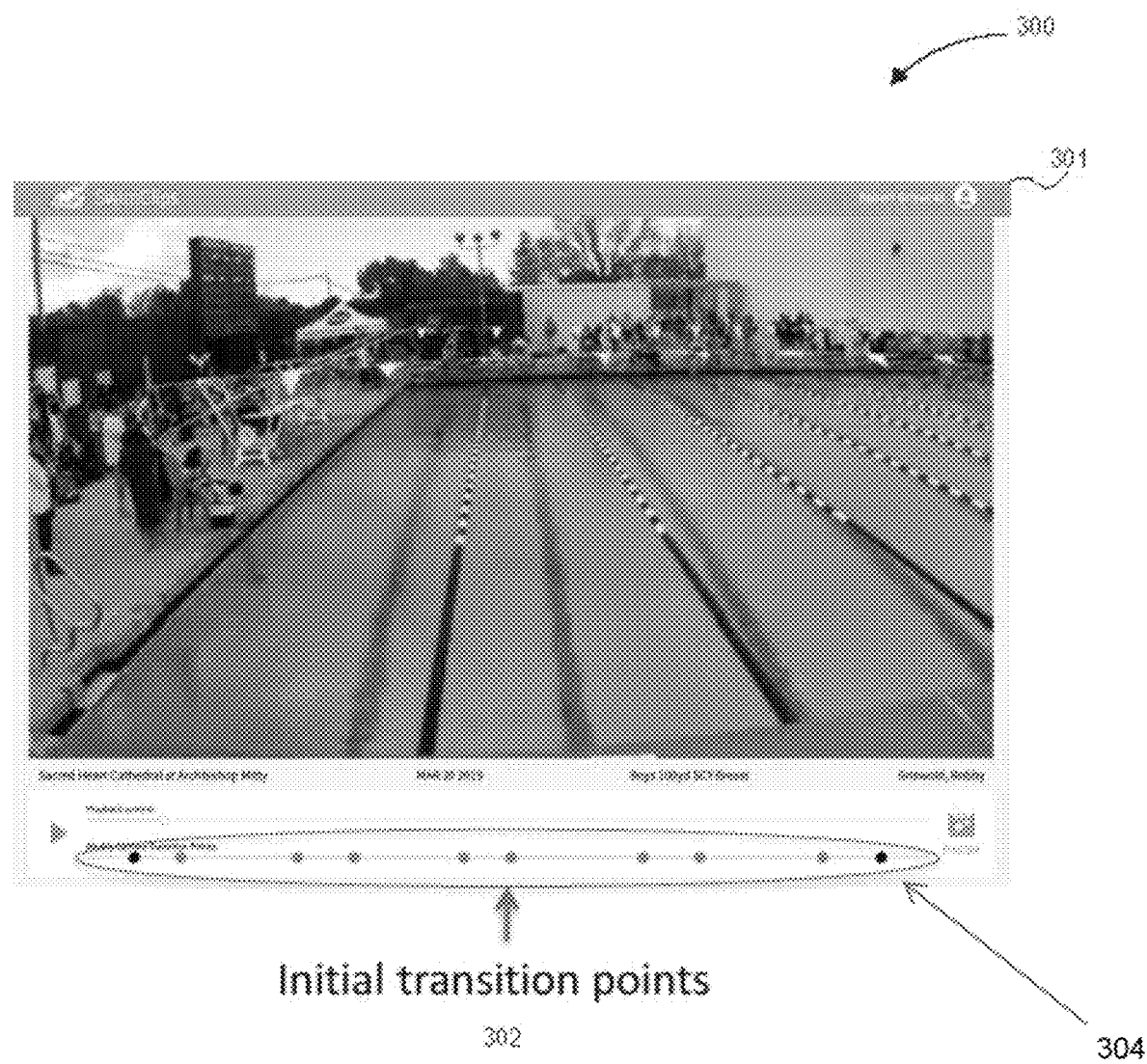
FIG. 3 illustrates one example of a multi-camera video screenshot of a video player showing initial transition points, according to an embodiment.

FIG. 3 illustrates one example of a multi-camera video GUI 300, according to an embodiment. In the illustrated embodiment, the GUI 300 includes a screenshot of an in-browser video player 301 showing initial transition points 302 on a timeline 304. It is to be appreciated that the GUI 300 can be a standalone application (i.e., not integrated into an in-browser video player), according to other embodiments.

In an embodiment, the initial transition points 302 can be determined by the server 190 based on data collected from sensors embedded in the race course, determined based on computer vision techniques to identify when an athlete is at a specific point in the race course, or calculated based on default rules, e.g., assuming constant pace. The default rules can be stored, for example, in the database 191. In an embodiment, using sensors embedded in the race course can provide most accurate transition points 203. Because the transition points 302 are easily modifiable, assuming a constant pace can provide transition points 302 having enough accuracy. This can reduce a processing load on the server 190 generating the transition points 302.

In an embodiment, the initial transition points 302 can be calculated by the server 190 based on a length of the sporting event that was recorded. For example, the sporting event can be a swim race having a distance of 100 yards (e.g., four lengths of a swimming pool). It is to be appreciated that the distance and number of laps is an example and that the actual race distance and course can vary beyond the stated values within the scope of the disclosure herein.

In the 100-yard race, a participant can have a final race time, e.g., of 55 seconds, with an average time per length of the pool of 13.75 seconds. Based on such times, a first transition point 302 can be 2 seconds after the start (0:02) and a second transition point 302 can be 2.5 seconds prior to the first turn at, e.g., (0:11.25), a third transition point 302 can be 2.5 seconds prior to the second turn (e.g., 0:25), and a fourth transition point 302 can be 2.5 seconds prior to the third turn (e.g., 0:38.75), and a fifth transition point 302 can be 2 seconds after the finish (e.g., 0:57). It is to be appreciated that the timing of these transition points 302 is an example, and can vary beyond the stated values (e.g., more or less than 2.5 seconds from the turn split, etc.).

Figure 4:
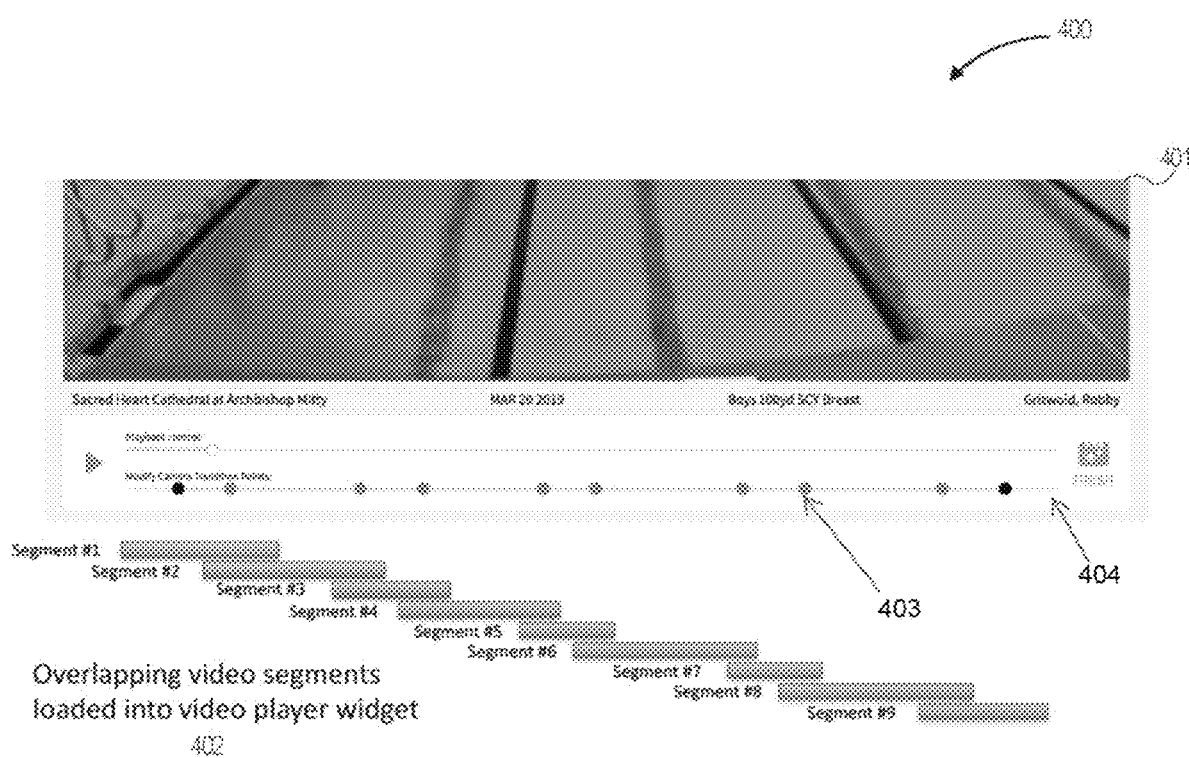
FIG. 4 illustrates one example of a multi-camera video screenshot of a video player having overlapping video segments, according to an embodiment.

FIG. 4 illustrates one example of a multi-camera video GUI 400, according to an embodiment. In the illustrated embodiment, the GUI is a screenshot of an in-browser video player 401 having overlapping video segments 402. It is to be appreciated that the GUI 400 can be a standalone application (i.e., not integrated into an in-browser video player), according to other embodiments.

The overlapping segments 402 can be loaded into the video player widget. In an embodiment, there can be any number of segments 402, e.g., segments 402A through segments 402I and so on. The extent of overlap of segments 402 can be as short as a few frames or as long as the entire video. Each segment 402 can be representative of video from a different camera (e.g., cameras 101-106) associated with a transition point 403 within timeline 404.

Figure 5:
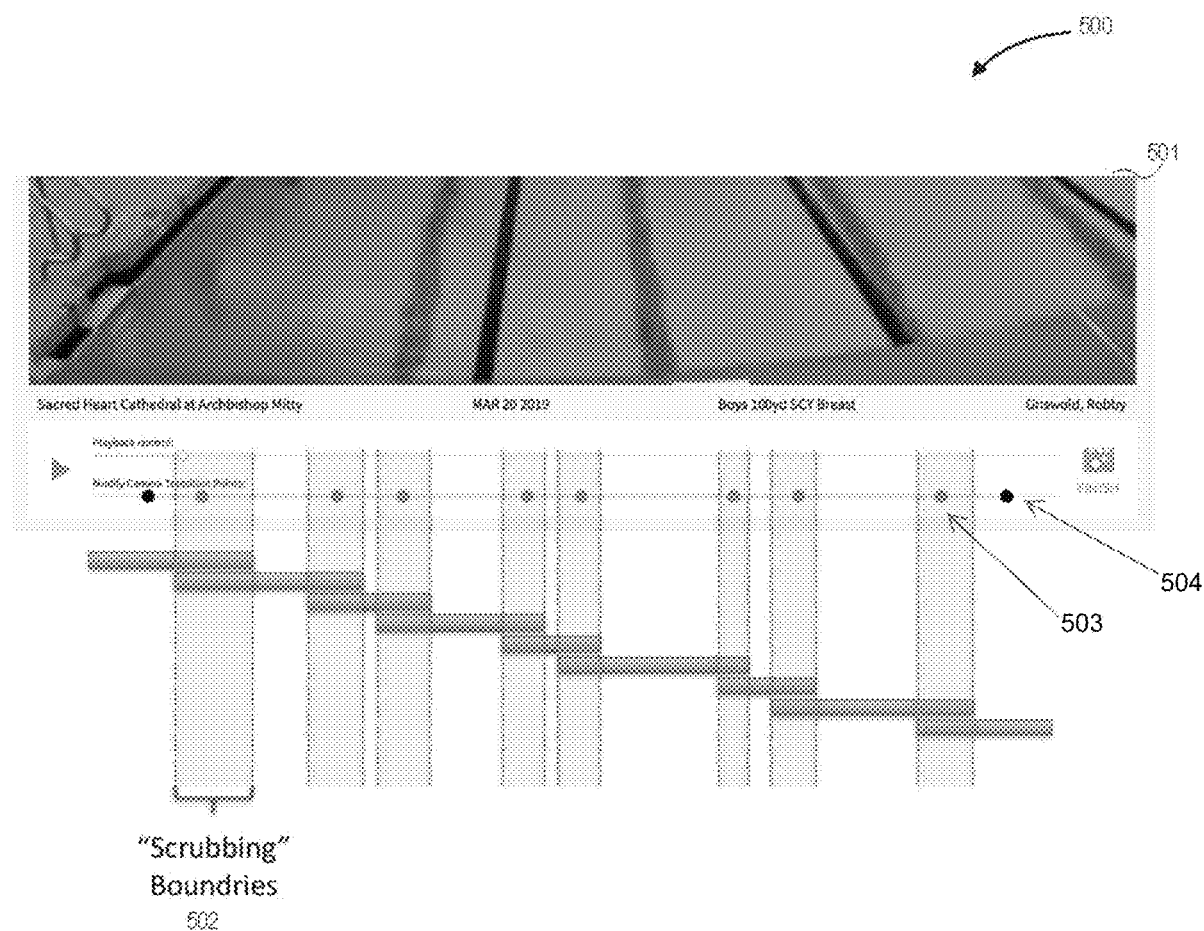
FIG. 5 illustrates one example of a multi-camera video screenshot of a video player illustrating the overlapping video segments where all areas of overlap scrubbing boundaries, according to an embodiment.

FIG. 5 illustrates one example of a multi-camera video GUI 500, according to an embodiment. In the illustrated embodiment, the GUI 500 is an in-browser video player 501 illustrating overlapping video segments. It is to be appreciated that the GUI 500 can be a standalone application (i.e., not integrated into an in-browser video player), according to other embodiments.

The areas of overlap have two separate camera views for the same time period and represent "scrubbing boundaries" 502. The scrubbing boundaries 502 are representative of the extent to which a camera transition point 503 can be moved by a user and still have a continuous video at the end. That is, moving a transition point outside of the scrubbing boundaries 502 can result in a discontinuous video (i.e., video with gaps in which no video of the sporting event is shown). It is to be appreciated that the scrubbing boundaries 502 can be extended all the way to the beginning and the end of the sporting event as well.

When these camera transition points 503 are moved along timeline 504 by the user, the video screen will show the video from one of the two camera views fast-forward or rewind, giving the user a clear idea of where in the video they would like the camera transition point 503 to occur. In this way, the transition points 503 can be moved to a customized position according to the user's selections.

The term "scrubbing," as used herein, refers to an interaction in which a user drags a cursor or playhead (e.g., a graphic line in the timeline 504 that represents the position, or frame, of the video being accessed) across a segment of a video to quickly locate specific points in the video. Scrubbing is a convenient way to quickly navigate a video file and is a common feature of modern video editing software.

In this example, this common user interaction technique is implemented in a browser-based video player 501 to provide a convenient and intuitive way for the user to quickly select the points in time in the video the user wants a camera transition to occur. Initial camera transition points 503 can be indicated in video player timeline 504 with overlapping video segments extending to either side (i.e., earlier, later) of each transition point 503. These overlapping segments represent the extent to which transition points 503 can be moved in each direction for the scrubbing boundaries 502 and can extend from several seconds before the race start to several seconds after the race conclusion.

Figure 6:
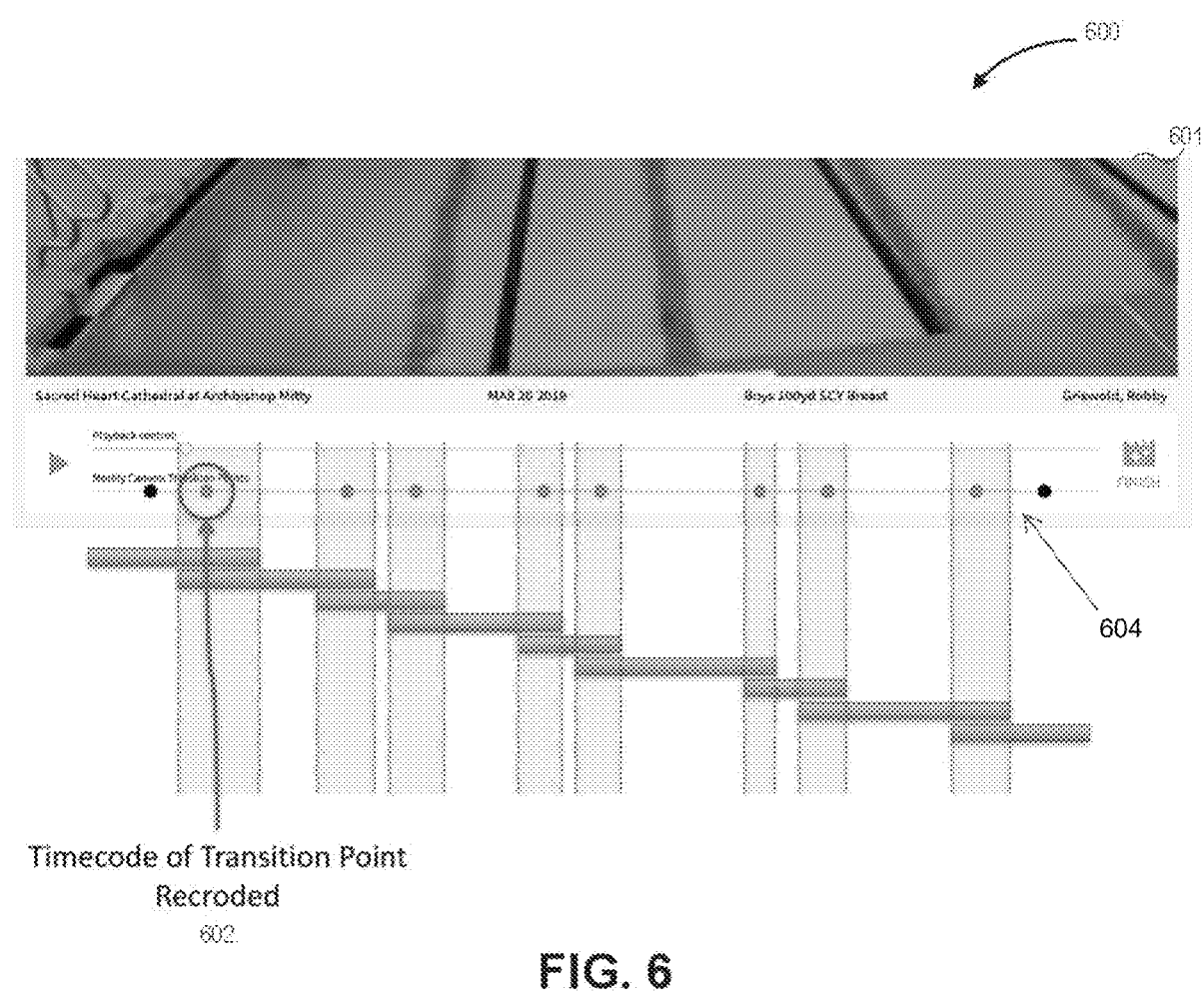
FIG. 6 illustrates one example of a multi-camera video screenshot of a video player recording a timecode of a transition point, according to an embodiment.

FIG. 6 illustrates one example of a multi-camera video GUI 600, according to an embodiment. The GUI 600 is representative of an in-browser video player 601 recording a timecode of a transition point 602 on a timeline 604. It is to be appreciated that the GUI 600 can be a standalone application (i.e., not integrated into an in-browser video player), according to other embodiments.

In an embodiment, when a user releases a handle, the video timecode of the transition point 602 associated with that moment can be recorded by the video rendering service to use that specific point for a final video edit. That is, the timecode can be sent from the browser of the user device 193 to the server 190 via the network 192 for storage in the database 191. In this way, control of transition points 602 for final recording can be obtained.

Figure 7:
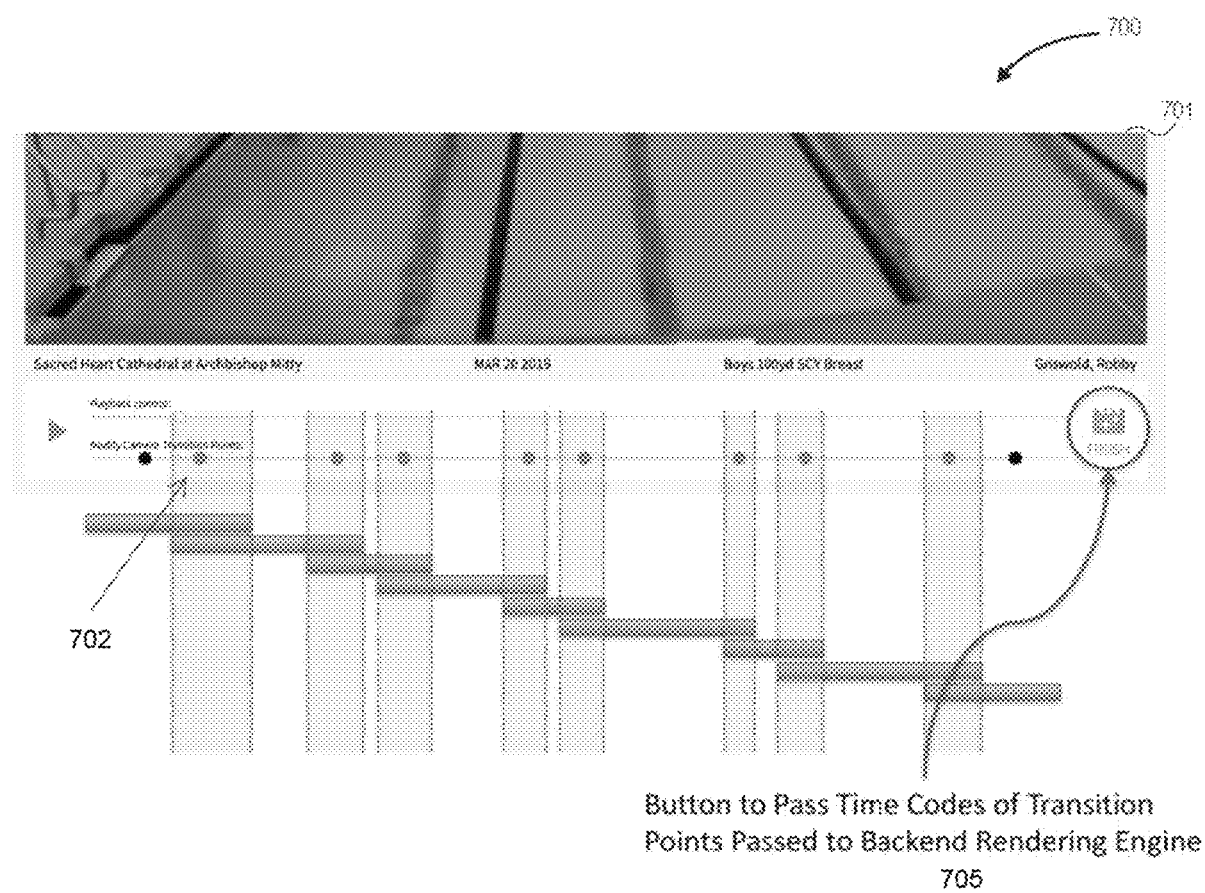
FIG. 7 illustrates one example of a multi-camera video screenshot of a video player illustrating how the user can finalize the transition point editing, which passes the timecodes of each newly selected transition points up to the rendering engine, according to an embodiment.

FIG. 7 illustrates one example of a multi-camera video GUI 700, according to an embodiment. The illustrated GUI 700 is an in-browser video player 701 passing timecodes of transition points 702 from the browser of the user device 193 to the server 190 via the network 192 for storage in the database 191. It is to be appreciated that the GUI 700 can be a standalone application (i.e., not integrated into an in-browser video player), according to other embodiments.

In an embodiment, when a user is finished editing and requests a final video to be generated (e.g., via finish button 705), the selected timecodes of the transition points 702 are sent to the server 190, the server 190 can use the transition points as received to select the consecutive video and audio segments to assemble into the final multi-camera video from the database 191.

Figure 8:
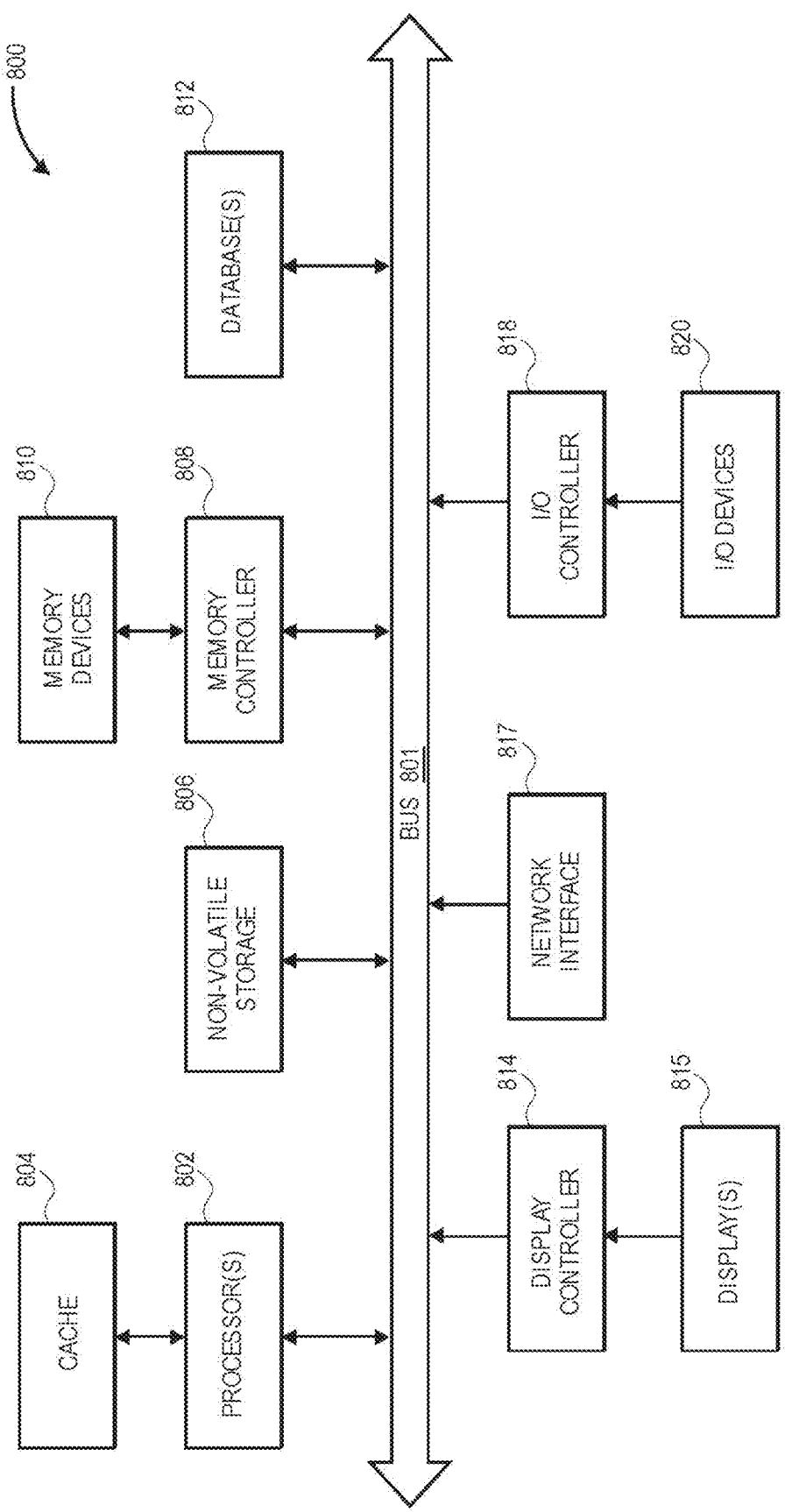
FIG. 8 illustrates one example block diagram of a computing or data processing system for implementing editing of camera transition points in multi-camera video using overlapping video segments, according to an embodiment.

FIG. 8 illustrates one example block diagram of a computing or data processing system 800, according to an embodiment. The computing or data processing system 800 can represent logging device 107, a computer or microprocessor board connected to a camera, or a cloud-based system providing a cloud-based service described herein.

Although FIG. 8 illustrates various components of a computing or data processing system 800, the components are not intended to represent any specific architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

In the illustrated embodiment, computing system 800 includes a bus 801, which is coupled to processor(s) 802 coupled to cache 804, display controller 814 coupled to a display 815, network interface 817, non-volatile storage 806, memory controller coupled to memory 810, I/O controller 818 coupled to I/O devices 820, and database(s) 812. Processor(s) 802 can include one or more central processing units (CPUs), graphical processing units (GPUs), a specialized processor or any combination thereof. Processor(s) 802 can be single-threaded or multi-threaded. Processor(s) 802 can retrieve instructions from any of the memories including non-volatile storage 806, memory 810, or database 812, and execute the instructions to perform operations described in the disclosed examples and embodiments.

Examples of I/O devices 820 include mice, keyboards, printers, cameras and other like devices controlled by I/O controller 818. In an embodiment, the I/O device can be a combined input and output device. For example, the I/O device 820 can be a display having an integrated touchscreen capable of receiving inputs from the user.

Network interface 817 can include modems, wired and wireless transceivers, and combinations thereof, and can communicate using any type of networking protocol including wired or wireless wide area network (WAN) and local area network (LAN) protocols including LTE and Bluetooth® standards.

Memory 810 can be any type of memory including random access memory (RAM), dynamic random-access memory (DRAM), static random-access memory (SRAM), Flash, or combinations thereof, which require power continually to refresh or maintain the data in the memory (i.e., volatile memory). In an embodiment, the memory 810 can be either a volatile memory or a non-volatile memory. In an embodiment, at least a portion of the memory can be virtual memory.

Non-volatile storage 806 can be a mass storage device including a magnetic hard drive, a magnetic optical drive, an optical drive, a digital video disc (DVD) RAM, a flash memory, other types of memory systems, or combinations thereof, which maintain data (e.g. large amounts of data) even after power is removed from the system. In an embodiment, the non-volatile storage 806 can include network attached storage (NAS) or connections to a storage area network (SAN) device, or the like. The non-volatile storage 806 can include storage that is external to the system 800, such as in the cloud.

For one example, memory devices 810 or database 812 can store data related to log 109, electronic timing system 110, scoreboard 111 and race data including video files from cameras 101-106. For other examples, memory devices 810 or database 812 can store videos and of assembled clips of a sporting event. Although memory devices 810 and database 812 are shown coupled to system bus 801, processor(s) 802 can be coupled to any number of external memory devices or databases locally or remotely by way of network interface 817, e.g., database 812 can be secured storage in a cloud environment.

Examples and embodiments disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 802) to implement the techniques and operations disclosed herein.

The computer readable medium can include a computer readable signal medium, a computer readable storage medium, or a combination thereof. A computer readable storage medium can include any tangible medium capable of storing a computer program for use by a programmable processor to perform functions described herein by operating on input data and generating an output. A computer program is a set of instructions that can be used, directly or indirectly, in a computer system to perform a certain function or determine a certain result.

Examples of computer readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

A computer readable signal medium can include a propagated data signal having computer readable instructions. Examples of propagated signals include, but are not limited to, an optical propagated signal, an electro-magnetic propagated signal, or the like. A computer readable signal medium can include any computer readable medium that is not a computer readable storage medium that can propagate a computer program for use by a programmable processor to perform functions described herein by operating on input data and generating an output.

Figure 9:
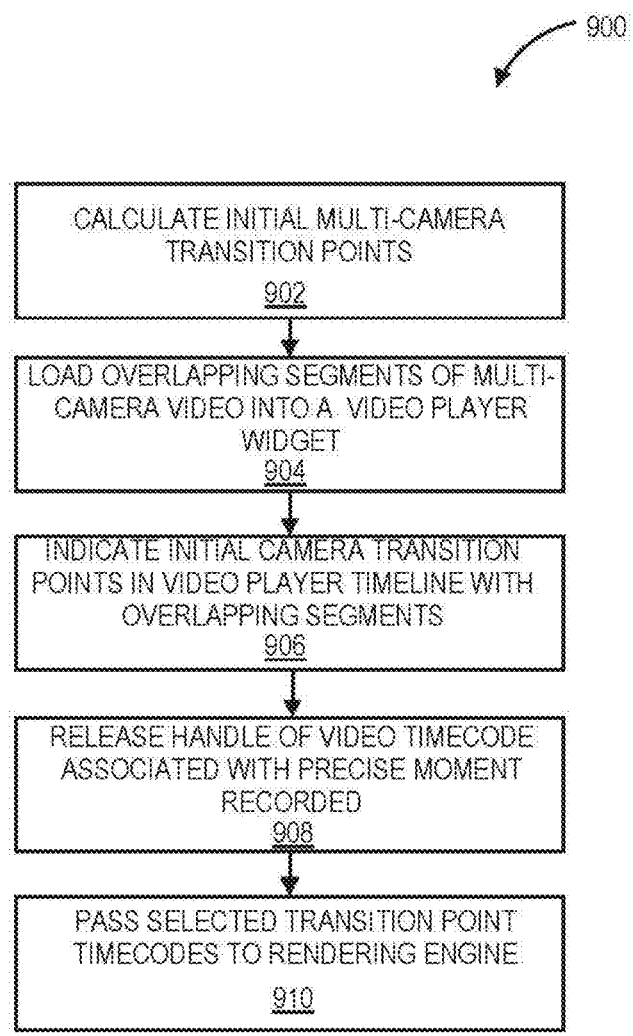
FIG. 9 illustrates one example of flow diagram of an operation for implementing editing of camera transition points in multi-camera video using overlapping video segments for scrubbing, according to an embodiment.

FIG. 9 illustrates one example of flowchart of a method 900 for implementing in-browser editing of camera transition points in multi-camera video using overlapping video segments for scrubbing, according to an embodiment. The method 900 includes blocks 902 through 910.

At block 902, initial multi-camera transition points are calculated by a computing system (e.g., the server 190 in FIG. 1B). In an embodiment, the computing system can calculate transition points based on default rules, e.g., assuming constant pace of the race.

At block 904, overlapping segments of multi-camera videos are loaded from a database (e.g., the database 191) into a video player video widget on a user device (e.g., the user device 193). In an embodiment, the video player is an in-browser video player. In an embodiment, the video player is in a standalone application. In an embodiment, segments loaded in the video player can be lower resolution than the final multi-camera video to facilitate more responsive scrubbing and minimize bandwidth consumption of the network (e.g., the network 192).

At block 906, initial camera transition points are indicated in the video player timeline with overlapping video segments extending to either side (i.e., earlier, later) of each transition point. For one example, the overlapping segments can represent the extent to which transition points can be moved in each direction and can extend from several seconds before the race start to several seconds after the race conclusion.

At block 908, when a user releases the handles, the video timecode associated with that moment is recorded.

At block 910, when a user is finished editing and requests final video to be generated, the selected transition point timecodes are passed to the backend rendering engine or service (e.g., the server 190), which uses the transition points received to select the consecutive video and audio segments to assemble into a final multi-camera video and generates the final multi-camera video.

The terminology used in this specification is intended to describe embodiments and is not intended to be limiting. The terms "a," "an," and "the" include the plural forms as well, unless clearly indicated otherwise. The terms "comprises" or "comprising," when used in this specification, specify the presence of the stated features, integers, steps, operations, elements, components, or combinations thereof, but do not preclude the presence or addition of one or more other features, integers, steps, operations, elements, components, or combinations thereof.

In the foregoing specification, reference has been made to specific examples and exemplary embodiments thereof. It will, however, be evident that various modifications and changes may be made thereto without departing from the broader spirit and scope of disclosed examples and embodiments. The specification and drawings are, accordingly, to be regarded in an illustrative rather than a restrictive sense. The true scope and spirit of the disclosure is indicated by the claims that follow.

What is claimed is:

1. A system, comprising:
a server having a processor and a memory;
a communication network;
a database in electronic communication with the server, wherein the server is configured to:
provide a widget that a user can load onto a computing device having a display screen and an input device, the widget permitting the user to electronically edit a multi-camera video;
receive, by the server, a request for editing a multi-camera video including a plurality of video streams from the widget;
send, by the server, the multi-camera video as requested to the computing device for display in a video player;
cause the video player to display a timeline, a plurality of transition points, and a plurality of video segments in the widget,
wherein the plurality of transition points are initially determined based on race data corresponding to the multi-camera video;
receive, from the computing device, a modified transition point including a timestamp associated with a respective one of the plurality of transition points; and
generate, by the server, a modified multi-camera video based on the modified transition point.

2. The system of claim 1, wherein the video player is an in-browser video player or a standalone application.

3. The system of claim 1, wherein the plurality of transition points are initially determined based on a fixed interval based on the race data.

4. The system of claim 1, wherein the server is further configured to send the multi-camera video as generated to the computing device.

5. The system of claim 1, wherein the plurality of video segments in the widget include a scrubbing region in which the plurality of transition points can be moved to create a continuous multi-camera video.

6. The system of claim 1, wherein the multi-camera video is of a sporting event, wherein the sporting event is a swimming event and the multi-camera video includes a plurality of videos captured above water and below water.

7. The system of claim 1, wherein the multi-camera video is of a sporting event, wherein the sporting event comprises a fixed course and the multi-camera video is generated for a plurality of different fixed views of the fixed course.

8. A computer-implemented method for electronically editing a multi-camera video of a sporting event, comprising:
   receiving, by a server, a request for editing a multi-camera video including a plurality of video streams from a browser of a user device;
   sending, by the server, the multi-camera video as requested to the browser of the user device for display in a video player;
   causing the video player to display a widget including a timeline, a plurality of transition points, and a plurality of video segments,
      wherein the plurality of transition points are initially determined based on race data corresponding to the multi-camera video;
   receiving, from the user device, a modified transition point including a timestamp associated with a respective one of the plurality of transition points; and
   generating, by the server, a modified multi-camera video based on the modified transition point.

9. The computer-implemented method of claim 8, wherein the video player is an in-browser video player or a standalone application.

10. The computer-implemented method of claim 8, wherein the plurality of transition points are initially determined based on a fixed interval based on the race data.

11. The computer-implemented method of claim 8, comprising: sending the multi-camera video as generated to the user device.

12. The computer-implemented method of claim 8, wherein the plurality of video segments in the widget include a scrubbing region in which the plurality of transition points can be moved to create a continuous multi-camera video.

13. The computer-implemented method of claim 8, wherein the sporting event is a swimming event and the multi-camera video includes a plurality of videos captured above water and below water.

14. The computer-implemented method of claim 8, wherein the sporting event comprises a fixed course and the multi-camera video is generated for a plurality of different fixed views of the fixed course.

15. A non-transitory computer-readable storage medium, comprising computer-readable instructions thereon, wherein the computer-readable instructions, when executed, are configured to:
   provide a widget that a user can load onto a computing device having a display screen and an input device, the widget permitting the user to electronically edit a multi-camera video;
   receive a request for editing a multi-camera video including a plurality of video streams from the widget;
   send the multi-camera video as requested to the computing device for display in a video player;
   cause the video player to display a timeline, a plurality of transition points, and a plurality of video segments in the widget,
      wherein the plurality of transition points are initially determined based on race data corresponding to the multi-camera video;
   receive a modified transition point including a timestamp associated with a respective one of the plurality of transition points; and
   generate a modified multi-camera video based on the modified transition point.

16. The non-transitory computer-readable storage medium of claim 15, wherein the video player is an in-browser video player or a standalone application.

17. The non-transitory computer-readable storage medium of claim 15, wherein the plurality of transition points are initially determined based on a fixed interval based on the race data.

* * * * *